United States Patent
Li et al.

(10) Patent No.: US 8,767,812 B2
(45) Date of Patent: Jul. 1, 2014

(54) SYSTEMS AND METHODS FOR FREQUENCY DOMAIN REALIZATION OF NON-INTEGER FRACTIONALLY SPACED TIME DOMAIN EQUALIZATION

(75) Inventors: Lin Lin Li, Morganville, NJ (US); Amitkumar Mahadevan, Edison, NJ (US)

(73) Assignee: Ikanos Communications, Inc., Fremont, CA (US)

( * ) Notice: Subject to any disclaimer, the term of this patent is extended or adjusted under 35 U.S.C. 154(b) by 395 days.

(21) Appl. No.: 13/081,962

(22) Filed: Apr. 7, 2011

(65) Prior Publication Data

US 2011/0255586 A1    Oct. 20, 2011

Related U.S. Application Data

(60) Provisional application No. 61/324,585, filed on Apr. 15, 2010.

(51) Int. Cl.
*H03H 7/30* (2006.01)

(52) U.S. Cl.
USPC ........... 375/231; 375/229; 375/230; 375/232; 375/316; 375/350

(58) Field of Classification Search
USPC ......... 375/219, 229, 230, 231, 232, 316, 322, 375/324, 343, 350
See application file for complete search history.

(56) References Cited

U.S. PATENT DOCUMENTS

| | | | | |
|---|---|---|---|---|
| 6,057,793 A * | 5/2000 | Gong et al. | ............... | 341/143 |
| 6,778,599 B1 * | 8/2004 | Doron | ............... | 375/232 |
| 6,834,079 B1 * | 12/2004 | Strait et al. | ............... | 375/232 |
| 7,076,010 B1 * | 7/2006 | Heidari et al. | ............... | 375/346 |
| 7,130,345 B2 * | 10/2006 | Mujica et al. | ............... | 375/235 |
| 7,136,411 B2 * | 11/2006 | Strauessnigg | ............... | 375/219 |
| 7,177,988 B2 * | 2/2007 | Efland et al. | ............... | 711/150 |
| 7,180,938 B2 | 2/2007 | Sandberg et al. | | |
| 7,224,725 B2 * | 5/2007 | Kim | ............... | 375/232 |
| 7,263,133 B1 * | 8/2007 | Miao | ............... | 375/267 |
| 7,970,046 B2 * | 6/2011 | Garth et al. | ............... | 375/229 |
| 2003/0112861 A1 * | 6/2003 | Erdogan et al. | ............... | 375/232 |
| 2005/0175112 A1 * | 8/2005 | Pisoni et al. | ............... | 375/260 |
| 2005/0286649 A1 * | 12/2005 | Redfern | ............... | 375/260 |

(Continued)

OTHER PUBLICATIONS

Chow, et al., Equalizer Training Algorithms for Multicarrier Modulation Systems,Communications, ICC 93. Geneva. Technical Program, Conference Record, IEEE International Conference May 1993 p. 761-765.

(Continued)

*Primary Examiner* — Hirdepal Singh
(74) *Attorney, Agent, or Firm* — Pillsbury Winthrop Shaw Pittman LLP

(57) ABSTRACT

Various systems and methods are described for performing fractionally spaced time domain equalization (TEQ). One embodiment is a method implemented in a communication system for training a fractionally spaced time domain equalizer (TEQ). The method comprises performing an initialization phase, averaging a received signal in the system to reduce effects of noise in a channel, determining a channel estimate, and aligning an ideal reference signal with the received signal. The method further comprises updating a target response filter according to a non-integer multiple of a base sampling rate, determining an adaptation error based on useful information both inside and outside a Nyquist band of the TEQ, and updating the TEQ according to the adaptation error.

22 Claims, 7 Drawing Sheets

(56) References Cited

U.S. PATENT DOCUMENTS

| 2006/0104339 | A1* | 5/2006 | Langberg et al. | 375/222 |
|---|---|---|---|---|
| 2006/0153310 | A1 | 7/2006 | Tung | |
| 2006/0158366 | A1* | 7/2006 | Kim | 341/155 |
| 2007/0121718 | A1* | 5/2007 | Wang et al. | 375/233 |
| 2007/0189427 | A1* | 8/2007 | Haghighat | 375/350 |
| 2010/0135377 | A1* | 6/2010 | Li et al. | 375/232 |
| 2010/0183054 | A1* | 7/2010 | Daly et al. | 375/219 |
| 2011/0090946 | A1* | 4/2011 | Mergen et al. | 375/232 |
| 2011/0236025 | A1* | 9/2011 | Wagner et al. | 398/115 |
| 2012/0087399 | A1* | 4/2012 | Sandberg et al. | 375/219 |

OTHER PUBLICATIONS

Benvenuto, et al., Algorithms for Communications Systems and Their Applications, Chapter 8—Channel Equalization and Symbol Detection, Aug. 2002, p. 630-635.

Ouyang, et al., TEQ Study for ADSL2 Downstream, Conexant, Inc. Aug. 2008, p. 1-68.

ITU-T G992.5, Series G Transmission Systems and Media, Digital Systems and Networks, Digital Sections and Digital Line System-Access networks, Asymmetric Digital Subscriber Line (ADSL) transceivers—Extended Bandwidth ADSL2 (ADSL2+) May 2003 p. 1-81.

International Search Report dated Oct. 11, 2011.

* cited by examiner

SYSTEMS AND METHODS FOR FREQUENCY DOMAIN REALIZATION OF NON-INTEGER FRACTIONALLY SPACED TIME DOMAIN EQUALIZATION

CROSS-REFERENCE TO RELATED APPLICATION

This application claims priority to, and the benefit of, U.S. Provisional Patent Application entitled, "Method and System for Frequency Domain Realization of Non-Integer Fractionally Spaced Time Domain Equalizer," having Ser. No. 61/324,585, filed on Apr. 15, 2010, which is incorporated by reference in its entirety.

TECHNICAL FIELD

The present disclosure generally relates to communications and more particularly relates to systems and methods for performing combined equalization in a communication system, for example, but not limited to, a DMT (discrete multi-tone) system.

BACKGROUND

Discrete multi-tone (DMT) systems often use a time domain equalizer (TEQ) to shorten the channel and reduce inter symbol interference (ISI), where the TEQ is generally trained using a periodic signal. At the transmit side, the training signal (i.e., the ideal reference) can be generated in the frequency domain as X(k) where k is the bin number. This signal is converted to the time domain via an inverse fast Fourier transform (IFFT) and processed in the later stages by, for example, the digital/analog transmit filter and digital-to-analog converter (DAC) before transmission of data on the channel. At the receiver side, the signal is processed by an analog circuit and sent to an analog-to-digital converter (ADC). Suppose that the time domain signal on the transmit side is x(n) sampled at the Nyquist rate and the channel response is presented by h(n). The received signal after ADC may be determined by linear convolution of the transmit signal and the channel response.

Because the channel length is typically longer than the cyclic prefix length v, inter-symbol interference (ISI) between consecutive DMT symbols is generated. To reduce ISI, a channel shortening filter or TEQ is applied to the received signal path. Training of the filter W is achieved using a target response filter B which is constrained to a length of v+1. The TEQ training can be implemented in time domain or in frequency domain. To effectively use the resources (for example, to use the existing fast Fourier transform (FFT) engine for frequency domain signal processing), a frequency domain trained symbol-spaced TEQ (T-spaced TEQ) can be used for channel shortening.

Generally, the advantage of a T-spaced TEQ is its degree of simplicity. However, a well-known problem associated with T-spaced TEQ is the aliasing that folds back into the useful signal band. The transmit filter is typically not sharp enough to filter out the images from the inverse fast Fourier transform (IFFT) stage. A sharper filter requires additional resources (e.g., digital or analog components). Also, a very sharp filter introduces some issues for the TEQ due to the large group delay. Thus, with a T-spaced TEQ, the images above the Nyquist bandwidth will be folded back into the signal band. This aliasing may be added constructively or destructively and therefore, adversely affects performance. While techniques exist for mitigating the effects of aliasing, various perceived shortcomings exist such as divergence of filter coefficients for integer fractionally-spaced TEQ.

SUMMARY

Briefly described, one embodiment, among others, is a method for training a time domain equalizer (TEQ) in the frequency domain. The method comprises setting a sampling rate of the TEQ according to a base sampling rate and an oversampling factor F0, wherein the oversampling factor F0 is greater than 1. The method further comprises determining a difference between a desired frequency domain signal and an actual frequency domain signal.

Another embodiment is a method implemented in a communication system for training a fractionally spaced time domain equalizer (TEQ). The method comprises performing an initialization phase, averaging a received signal in the system to reduce effects of noise in a channel, determining a channel estimate, and aligning an ideal reference signal with the received signal. The method further comprises updating a target response filter according to a non-integer multiple of a base sampling rate, determining an adaptation error based on useful information both inside and outside a Nyquist band of the TEQ, and updating the TEQ according to the adaptation error.

Another embodiment is a system for training a fractionally spaced time domain equalizer (TEQ). The system comprises logic for setting a sampling rate of the TEQ according to a base sampling rate and an oversampling factor F0, wherein the oversampling factor F0 is between a value of 1 and 2. The system further comprises logic for determining a convergence rate and maximum number of iterations for a least mean square (LMS) process for adjusting the TEQ, logic for averaging a received signal in the system to reduce effects of noise in a channel, and logic for determining a channel estimate. The system further comprises logic for aligning an ideal reference signal with the received signal, logic for updating a target response filter according to a non-integer multiple of the base sampling rate, logic for determining an adaptation error based on useful information both inside and outside a Nyquist band of the TEQ, and logic for updating the TEQ according to the adaptation error.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
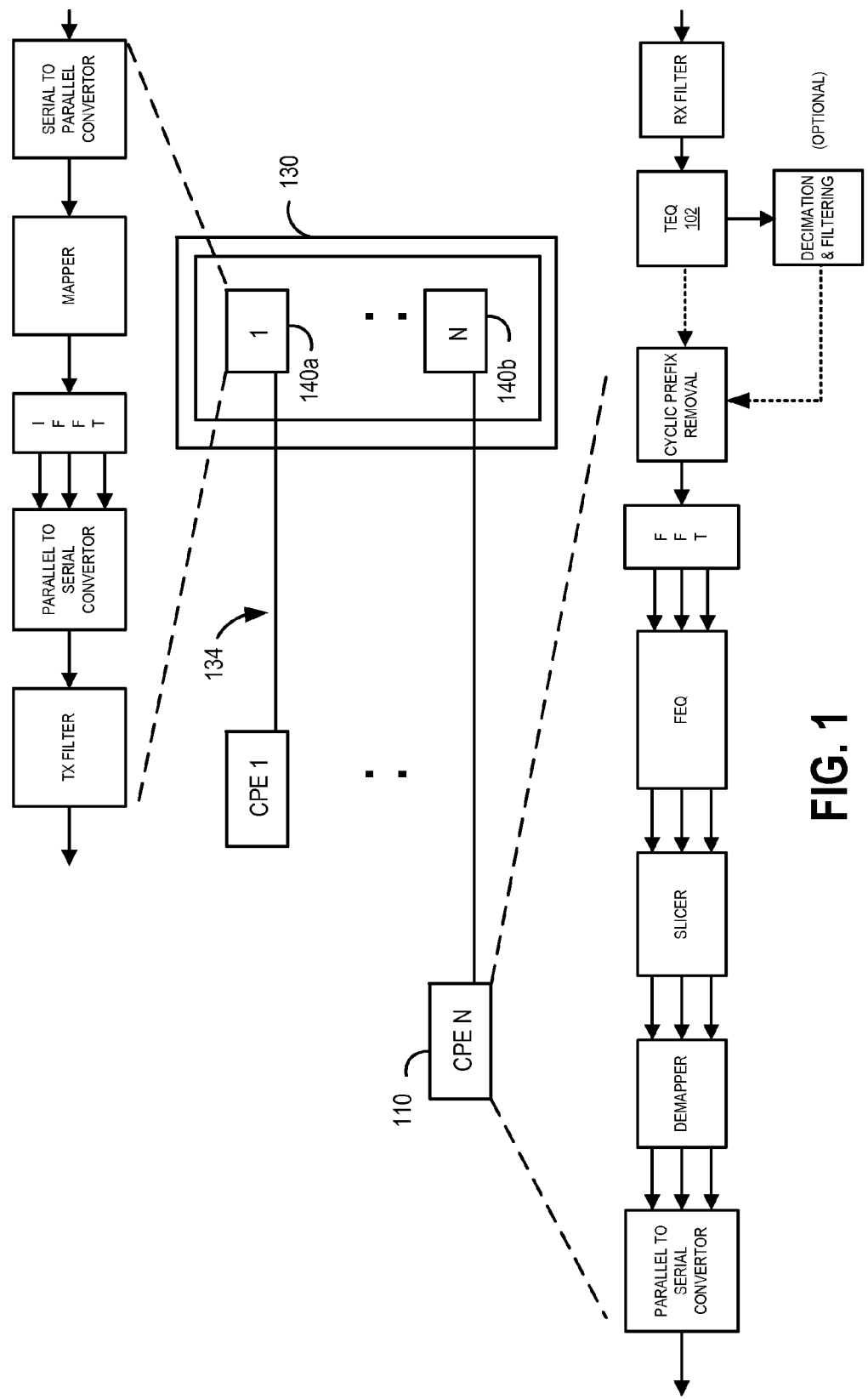
FIG. 1 depicts an xDSL system in which embodiments of the TEQ system described may be implemented.

Having summarized various aspects of the present disclosure, reference will now be made in detail to the description of the disclosure as illustrated in the drawings. While the disclosure will be described in connection with these drawings, there is no intent to limit it to the embodiment or embodiments disclosed herein. On the contrary, the intent is to cover all alternatives, modifications and equivalents included within the spirit and scope of the disclosure as defined by the appended claims.

Discrete multi-tone (DMT) modulation is one of the most prominent modulation methods used for high-speed digital communications. DMT modulation partitions a broadband channel into a large number of virtually independent, narrowband sub-channels. Ideally, each narrowband sub-channel has a flat frequency response and may be modeled as a gain plus additive white Gaussian noise (AWGN). The total number of bits transmitted over the broadband channel is the sum of the bits transmitted in each narrowband sub-channel. Modulation by an inverse fast Fourier transform (IFFT) operation and demodulation via a fast Fourier transform (FFT) operation create orthogonal sub-channels. A spectrally shaped channel, however, destroys the orthogonality between sub-channels so that they cannot be fully separated at the receiver and causes both inter-carrier interference (ICI) and inter-symbol interference (ISI).

DMT systems typically employ a cyclic prefix in the time domain for every DMT symbol. The samples in the cyclic prefix (v samples) of a DMT symbol protect against interference from samples of the previous DMT symbol, i.e., ISI, provided that the dispersion caused by the channel is less or equal to (v+1). If the dispersion of the channel exceeds (v+1), which typically happens at longer loop lengths, DMT systems often use a time domain equalizer (TEQ) to arrive at a shortened equalized channel (convolution of actual channel and TEQ) to within (v+1) samples and thereby reduce inter symbol interference (ISI). In digital subscriber line (xDSL) systems, the TEQ is typically trained using the REVERB training sequence, which is periodic. At the transmit side, the training signal (i.e., the ideal reference) can be generated in the frequency domain as X(k) where k is the bin number. This signal is converted to the time domain via an inverse fast Fourier transform (IFFT) and processed by the later stages, for example, by the digital/analog transmit filter and digital-to-analog converter (DAC) before transmission of data on the channel.

At the receiver side, the signal is typically processed by an analog circuit and sent to an analog-to-digital converter (ADC). Suppose that the time domain signal on the transmit side is represented by x(n) and the channel response is h(n) wherein x(n) is sampled at the Nyquist rate. The received signal after ADC may be determined by performing a linear convolution of the transmit signal and the channel response.

The TEQ is a finite impulse response (FIR) filter. The equalized channel, which is the cascading of the channel and the TEQ, can be modeled as a delay followed by an FIR filter whose impulse response represents a target impulse response (TIR). The number of non-zero samples in the TIR must be less than or equal to the length of the cyclic prefix+1 in order to prevent interference between consecutive DMT symbols (inter-symbol interference). As mentioned earlier, a training signal (REVERB) is used to train the TEQ. From the transmit side, the training signal (i.e., the ideal reference) can be generated from the frequency domain as X(k) where k is the bin number.

In accordance with basic sampling theory, the minimum sampling rate is 2B for a given analog signal with a bandwidth of B (the bandwidth is limited). After sampling is performed, this analog signal is converted to a discrete signal. However, in the frequency domain, the discrete signal repeats itself in both positive and negative frequencies instead of only occupying a bandwidth of B. The repeated versions of the discrete signal are referred to as signal images. Therefore, near the useful analog signal boundary, an image will appear. A TEQ system with such a sampling frequency is called symbol-spaced TEQ or T-spaced TEQ. To further illustrate the concepts relating to a T-spaced TEQ, suppose that a system comprises an IFFT module of size N. For bin 0, a value of zero is put there. For bin 1 to bin $N_{bin}-1$, complex numbers are placed according to the standards. For bin $N_{bin}$, a zero (or real value) is inserted. For those bins with a larger index, the Hermitian symmetry property is relied upon to assign values. Based on this, the size of the IFFT/FFT module is given by:

$$N=2N_{bin} \qquad (1)$$

The frequency domain signal is converted to the time domain via an IFFT operation and processed by later stages such as the digital/analog transmit filter and DAC. From there, the signal is sent to the real channel.

At the receiver side, the signal is processed by an analog circuit and sent to an analog-to-digital converter (ADC). If the time domain signal in transmit side is x(n) (sampled at Nyquist rate), the channel response is h(n), the received signal after the ADC will be $$y(n)=x(n)*h(n) \qquad (2)$$

Note that here, the noise term is not included for the sake of simplicity. The convolution above is a linear operation. Because the channel length will normally be longer than the prefix length v, inter-symbol interference (ISI) is generated. To reduce ISI, a channel shortening filter or TEQ (represented herein by W) is applied to the received signal path. Training of the filter W is achieved using a target response filter (represented herein by B) which is constrained to a length of v+1. To effectively use the resources (the existing FFT engine used for frequency domain signal processing), a frequency domain trained symbol-spaced TEQ can be used for channel shortening. Thus, the TEQ training can be implemented in the time domain or in the frequency domain.

However, a well-known problem associated with T-spaced TEQ implementations is the aliasing due to images being folded back into the useful signal band. The transmit filter is typically not sharp enough to filter out the images from the IFFT, and a sharper filter requires additional resources (e.g., digital or analog components). Also, a very sharp filter introduces some issues for the receive TEQ due to the large group delay. Thus, with a T-spaced TEQ, the images above the Nyquist bandwidth will be folded back into the signal band. This aliasing may be added constructively or destructively and ultimately adversely affects performance of the system.

While techniques exist for mitigating the effects of aliasing, various perceived shortcomings exist such as divergence of filter coefficients. To overcome the aliasing fold-back problem, over-sampling or a fractionally-spaced equalizer (FSE) with an over-sampling index F0 (where the index is an integer) may be used. The choice of the oversampling index F0=2 is commonly used due to its simplicity. With this index value, the received signal is sampled at twice the Nyquist rate. These samples are sent to the W filter (the channel shortening filter). The adaptive filter W has a sampling period T/2, and the output sample is down-sampled and thus has a sampling period T. The filter B operates at the sampling period T.

However, a well known issue with this approach is that the adaptive FSE may face issues in the presence of noise with variance that is small with respect to the level of the desired signal. In such scenarios, various eigen-values of the auto-correlation matrix for the W filter input may assume a value that is almost zero and consequently, the coefficients themselves become amplified. This effect can be illustrated also in the frequency domain. Outside the pass-band of the input signal, the coefficients of the filter W may assume arbitrary values in the limited cases when noise is absent. As a result, the coefficients of the filter W may vary in time and also assume very large values. To mitigate this problem, a leaky LMS algorithm may be used by slightly modifying the cost function. That is, a constraint is imposed on the amplitude of the coefficients. However, upon modifying the cost function, the minimum mean square error (MMSE) condition is modified, and an optimal solution offering the best performance is difficult to achieve.

Various embodiments are described for overcoming the various perceived shortcomings discussed above. Specifically, embodiments of a non-integer fractionally-spaced time domain equalizer are described that leverage the basic concept that excess bandwidth due to an imperfect transmit filter is only a fraction of the Nyquist bandwidth (e.g., about 15 to 25 percent). Instead of the typical configurations that implement an oversampling index F0 of 2 (involving 100% excess bandwidth for the TEQ W filter), various embodiments are directed to a non-integer F0 where an index value between 1 and 2 is used. By selecting the index value F0 such that F0 is neither close to 1 nor 2, both the aliasing problem and the filter coefficient diverging problems are mitigated. The basic idea is that excess bandwidth results from use of an imperfect transmit filter. Various embodiments seek to incorporate the useful signal in this excess bandwidth. With conventional approaches that incorporate sampling at the Nyquist rate, this excess bandwidth cannot be used and is therefore lost. A non-integer fractionally-spaced equalizer is used to capture the useful signal frequency range for B filter updating, error calculation, and W filter updating. Specifically, the information contained in the images of Y is used for B filter updating, W filter updating, and error calculation, thereby improving performance.

Various embodiments of a frequency domain realization of a non-integer fractionally spaced time domain equalizer (TEQ) for DMT systems are described. As will become apparent, the various embodiments address the aliasing fold-back effect resulting from a normal T-spaced TEQ. Optimum coefficients for a 2T/3-spaced over-sampling frequency TEQ are also derived. This ultimately improves system performance from the perspective of rate and reach. The embodiments described also increase the stability of the TEQ framework and provide flexibility in selecting the operating frequency of the TEQ. The computational resource required from the standpoint of MIPS (million instructions per second) can also be lowered with a typical T/2 sampling frequency TEQ. Note also that embodiments described may be applied to both the upstream and downstream paths of a DMT system and can be applied for various xDSL systems such as asymmetric DSL (ADSL) and very high speed DSL (VDSL). The embodiments described can be applied for any practical over-sampling factor from 1 to 2 in principle and can be generalized to other over-sampling factors. In accordance with some embodiments, an over-sampling rate of 3/2 is implemented.

Reference is made to FIG. 1, which depicts an xDSL system in which embodiments of the TEQ system described may be implemented. It should be emphasized that while an xDSL system is described in connection with various embodiments, the TEQ described may be implemented in other systems such as QAM (quadrature amplitude modulation) systems and OFDM (orthogonal frequency-division multiplexing) systems. As shown in FIG. 1, N sets of CPE 110 are depicted. Each CPE 110 is connected via a loop 134 to a central office (CO) 130. The CO 130 may include an xDSL access multiplexer (DSLAM), xDSL line card units 140a, 140b, and other equipment for interfacing with the CPE 110. In a DMT-based system, an incoming serial bit-stream is typically divided into parallel streams via a serial-to-parallel converter, which are used for performing quadrature amplitude modulation (QAM) on the various tones. In the transmit path, after modulation is performed via an IFFT block, a cyclic prefix is added to each symbol. If the prefix is longer than the channel impulse response (CIR), demodulation can be implemented on the receive path by an FFT block, followed by a complex one-tap frequency-domain equalizer (FEQ) for each tone to compensate for the channel amplitude and phase effects.

Referring to the CPE side, a TEQ 102 shortens the channel impulse response to fit within the cyclic prefix. If it is completely successful in doing this, all ISI is eliminated. Otherwise this effect persists. For some implementations, a TEQ filter (W) is used to shorten the impulse response and a cyclic prefix length target filter (B) is used to model the net channel impulse response. If a known sequence is sent by the transmitter, received signal at the received side can be sent through the W filter. The known transmitted signal can also be passed through the B filter and the error between the 2 outputs can be minimized.

Figure 2:
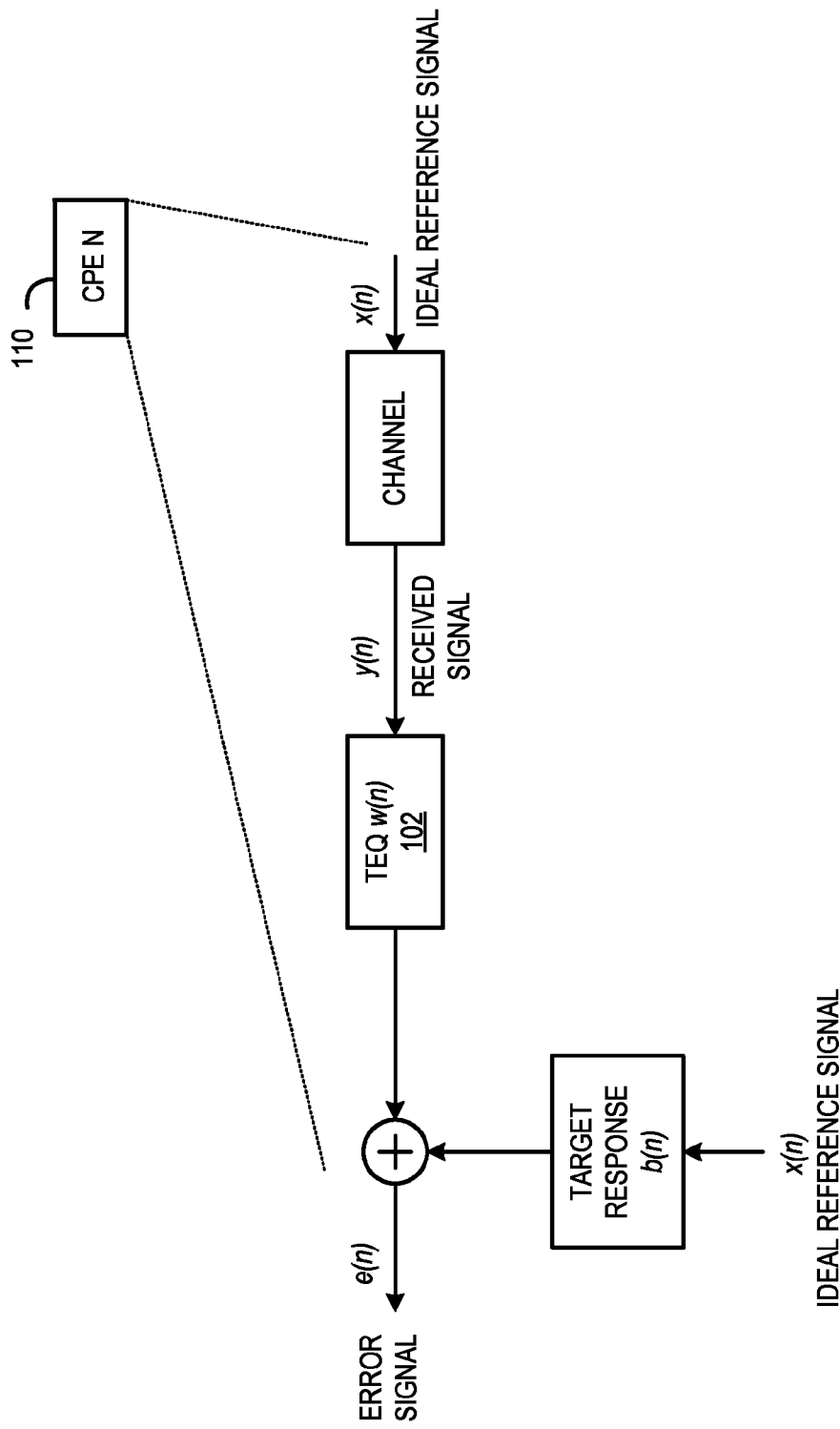
FIG. 2 depicts an embodiment of a non-integer fractionally spaced TEQ 102 implemented in one of the CPE in FIG. 1.
Figure 3:
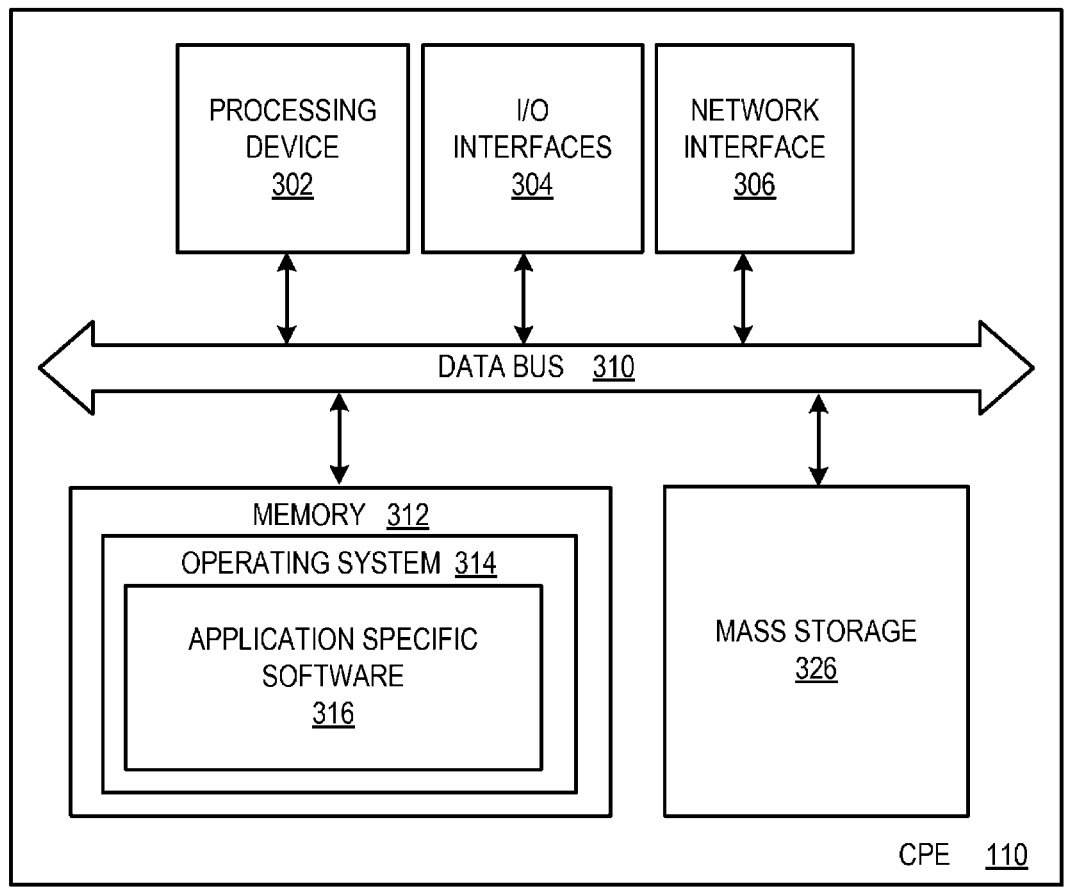
FIG. 3 illustrates an embodiment of the CPE shown in FIGS. 1 and 2 for incorporating a non-integer fractionally spaced time domain equalizer in accordance with various embodiments.

Reference is made to FIG. 2, which depicts an embodiment of a non-integer fractionally spaced TEQ 102 implemented in one of the CPE 110 in FIG. 1. For some embodiments, the CPE 110 may comprise a TEQ 102 configured to shorten the channel impulse response. The TEQ 102 is configured to shorten the duration of the channel impulse response (CIR) to within the duration of the cyclic prefix. By shortening the duration of the CIR, the effects of ISI is mitigated. FIG. 3 illustrates an embodiment of the CPE shown in FIGS. 1 and 2 for incorporating a non-integer fractionally spaced time domain equalizer in accordance with various embodiments.

Generally speaking, the CPE 110 can comprise any one of a wide variety of computing devices. Irrespective of its specific arrangement, the CPE 110 can, for instance, comprise memory 312, a processing device 302, a number of input/output interfaces 304, a network interface 306 (e.g., a wireless interface), and mass storage 326, wherein each of these devices is connected across a data bus 310.

Processing device 302 can include any custom made or commercially available processor, a central processing unit (CPU) or an auxiliary processor among several processors associated with the CPE 110, a semiconductor based microprocessor (in the form of a microchip), a macroprocessor, one or more application specific integrated circuits (ASICs), a plurality of suitably configured digital logic gates, and other well known electrical configurations comprising discrete elements both individually and in various combinations to coordinate the overall operation of the computing system.

The memory 312 can include any one of a combination of volatile memory elements (e.g., random-access memory (RAM, such as DRAM, and SRAM, etc.)) and nonvolatile memory elements (e.g., ROM, hard drive, tape, CDROM, etc.). The memory 312 typically comprises a native operating system 314, one or more native applications, emulation systems, or emulated applications for any of a variety of operating systems and/or emulated hardware platforms, emulated operating systems, etc. For example, the applications may include application specific software 316 stored on a computer readable medium that is executed by the processing device 302.

In accordance with some embodiments, the application specific software 316 may include the time domain equalizer 102 depicted in FIG. 2, where the application specific software 316 is stored on a computer readable medium and is executed by the processing device 302. It should be emphasized that while the time domain equalizer 102 may be implemented in software stored on a non-transitory computer readable medium and executable by the processing device 302, these components may also be implemented in hardware, firmware, or a combination of software, hardware, and firmware. One of ordinary skill in the art will appreciate that the memory 312 can, and typically will, comprise other components which have been omitted for purposes of brevity. Input/output interfaces 304 provide any number of interfaces for the input and output of data. With further reference to FIG. 3, network interface device 306 comprises various components used to transmit and/or receive data over a network environment. The CPE 110 may further comprise mass storage 326.

Although the various systems described herein may be embodied in software or code executed by general purpose hardware as discussed above, as an alternative, the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

Having described the basic framework and the system in which various embodiments of TEQ adaptation may be implemented, a detailed explanation of a frequency domain TEQ adaptation technique is now described, wherein the adaptation process is performed according to a recursive algorithm. The TEQ training technique described in connection with various embodiments is based on excess bandwidth that arises due to the use of an imperfect transmit filter that is only a fraction of the Nyquist bandwidth (on the order of approximately 15 to 25 percent). Thus, instead of a typical oversampling index F0=2 which results in 100 percent excess bandwidth for the TEQ W filter, various embodiments utilize a non-integer F0 set to a value between 1 to 2.

The technique described below mitigates the aliasing and filter coefficient divergence problems as long as the F0 index value is not set close to 1 or 2. For purposes of describing the TEQ training technique below, the following expressions and variables are used. First, suppose that the oversampling index F0 is expressed as:

$$F_0 = L/M, \quad (3)$$

where L and M are both integer values. For simplicity, assume that (L>M). Furthermore, assume that the ratio of $N_{bin}/M$ is an integer value in order to avoid fractional frequency-bin problems. Based on this, the fast Fourier transform (FFT) size of the received signal size is:

$$N = 2F_0 N_{bin} \quad (4)$$

Generally speaking, N will be an even number, where N represents the size of the TEQ W filter in the absence of any time domain windowing. With reference to the TEQ structure depicted in FIG. 2, let w be a vector representing a TEQ W filter with length of N (even). Thus, the TEQ W has taps w(0), w(1), . . . , w(N−1). Let $w_{win}$ represent real taps for the TEQ W filter with length $N_{teq}$. This will occupy the middle of w with non-zeros values, where:

$$w_{win}(n) = 0, \quad (5)$$
$$n = 0, 1, 2, \ldots, \left(\frac{N}{2} - \frac{N_{teq}}{2} + 1\right), \left(\frac{N}{2} + \frac{N_{teq}}{2}\right), \ldots, N-1$$

Let b be a vector represent the target response with length of $2N_{bin}$. Thus, the b filter has taps b(0), b(1), . . . , b($2N_{bin}$−1). Let $b_{win}$ represent the real taps for the TEQ B filter (target response) with length of $N_b$. If the prefix length is v, then the following holds true:

$$N_b \leq v+1 \quad (6)$$

Also, $b_{win}$ will occupy the middle of b as in the relationship between $w_{win}$ and w. Let x represent the signal transmitted from the transmit side. This serves as the ideal reference signal in the time domain and has a size of $2N_{bin}$, where:

$$X = FFT(x(n)) \quad (7)$$

Let y represent the signal received from the channel in the time domain after passing through the receive filter and input to the TEQ W filter (as shown in FIG. 2). The total length of this training signal is NP where P is the total number of received DMT symbols used for deriving a time domain average. This received signal can be sectioned into blocks with block length of N with each block being a DMT symbol (fractionally spaced). Let $y_j(n), n \in \{0, \ldots, N-1\}, j=1, 2, \ldots, P$ represent the N-sample real vector for block j. Finally, let h represent the channel response with size of N, where:

$$H = FFT(h(n)) \text{ with size of } N \quad (8)$$

Having described the various variables, an initialization phase is first performed as part of the TEQ training process. A least means square (LMS) initial step size $\mu_0$ is set to control the convergence rate and to ensure that no divergence occurs in the adaptation technique. Let the total number of iteration be represented by $N_{iter}$. For some embodiments, this number can be set between 256 and 512 for the initial realization and can be adjusted later for better performance. The counter that reflects the total number of iterations is set to i=0 where after each iteration, this counter is incremented. When the counter reaches the predetermined iteration number $N_{iter}$, the adaptation process is stopped. The value of $b_{win,i}$ is also set to zero. Note that if the LMS algorithm is initialized with all zeros for $w_{win,i}$ as well as for $b_{win,i}$, a zero solution is reached. Thus, to avoid an all zero solution for the LMS algorithm, the middle tap of $$w_{win,i}\left(\frac{N}{2}\right)$$

is set to a non-zero number. For some embodiments, the middle tap is set to a value between 0.5 to 1 (in a fixed point implementation), while all other taps of $w_{win,i}$ are set to zero.

Next, the time domain ideal reference signal is converted into the frequency domain. This ideal reference signal x(n) may be generated based on the following:

$$X(k)=\text{FFT}(x(n))\,k=0,1,\ldots,2N_{bin}-1 \quad (9)$$

where k indicates the bin number in the frequency domain. Note that this step can be skipped if the ideal reference is generated in the frequency domain.

The remote side sends a periodic training signal (e.g., a REVERB sequence) in the time domain. To reduce the effects of noise added to the channel, the received signal is averaged in the time domain. Suppose that the jth symbol of the received signal is $y_j(n)$, $n \in \{0, \ldots, N-1\}$ and P is the total number of blocks. The averaged receive signal $y_{avg}(n)$, $n \in \{0, \ldots, N-1\}$ is calculated based on the following:

$$y_{avg}(n) = \frac{1}{P}\sum_{j=1}^{P} y_j(n); n \in \{0, \ldots, N-1\} \quad (10)$$

The time domain average $y_{avg}$ is then transformed into the frequency domain:

$$Y(k)=\text{FFT}(y_{avg}(n))\,k=0,1,\ldots,N-1 \quad (11)$$

Next, a channel response estimation is derived and the channel delay is determined. To do this, the channel transfer function in the frequency domain is first determined:

$$H(k) = \frac{Y'(k)}{X(k)} = Y'(k)X^*(K)\ k = 1, 2, \ldots, \frac{LN_{bin}}{M} - 1. \quad (12)$$

It follows that the complex conjugate property yields H(k) with $$k = \frac{LN_{bin}}{M} + 1, \ldots, N-1.$$

The multiplication operations here are performed on an element-by-element basis. Next, the channel response estimation is converted to the time domain:

$$h(n)=\text{IFFT}(H(k)),k=0,1,\ldots,N-1,n=0,1,\ldots,N-1. \quad (13)$$

The peak location (D) of the frequency response is located, and the delay value is set equal to this peak location (D). This delay (D) is then used to shift the signal y sent to the TEQ (time domain signal after channel and after receive filter). Note that the delay (D) may also be selected based on the energy in a window of predefined width.

To align the received signal and the locally generated ideal reference, a circular shift of the time domain sequence $y_{avg}(n-D)$ is performed followed by an FFT operation:

$$Y(k)=\text{FFT}(y_{avg}(n-D)) \quad (14)$$

The aligned response is then used in the following derivation. The time domain W filter is transformed to the frequency domain:

$$W_i(k)=\text{FFT}(w_{win,i}(n)),k=0,1,\ldots,N-1. \quad (15)$$

The B filter representing the target response is updated in the frequency domain:

$$B_i(k) = Y(k)\cdot\frac{W_i(k)}{X(k)} = Y(k)W_i(k)X^*(k) \quad (16)$$

$$k = 0, 1, \ldots, (2-F_0)N_{bin} - 1$$

$$B_i(k) = ((Y(k)W_i(k) + Y(k+N_s)W_i(k+N_s))X^*(k) \quad (17)$$

$$k = (2-F_0)N_{bin}, \ldots, N_{bin} - 1$$

Note that $N_s=2N_{bin}F_0-2N_{bin}=2N_{bin}(F_0-1)$ represents the separation between the two images that contributes to the final result. As described earlier, various embodiments leverage the additional bandwidth available due to oversampling. Specifically, the various embodiments utilize the image region and avoid the constructive/destructive aliasing problem described in connection with conventional approaches. By utilizing the image region, performance is improved. The image signal can be collected based on the selection of the non-integer up-sampling rate.

The combined or equalized channel (i.e., the real channel convolved with the TEQ) is limited such that the channel is shorter than the length of the prefix. This is typically performed in the time domain. Thus, for various embodiments, the B filter is converted into the time domain via an inverse FFT operation:

$$b_i(n)=\text{IFFT}(B_i(k))\,n=0,1,\ldots,2N_{bin}-1. \quad (18)$$

A window that maximizes the energy in that window is identified by determining $n_i$ such that $\Sigma_{j=n_i}^{N_b+n_i-1}|b_j|$ is maximized. The $b_i$ value is kept inside the window and the coefficients $b_i$ the window are forced to be zero. This results in the windowed version of b, $b_{win,i}$. The windowed version target filter, $b_{win,i}$ is then converted back to the frequency domain. Next, the error is calculated:

$$B_{win,i}(k)=\text{FFT}(b_{win,i}(n))\,k=0,1,\ldots,2N_{bin}-1. \quad (19)$$

The adaptation error is solved:

$$E(k)=Y(k)W_i(k)-B_{win,i}(k)X(k)\,k=0,1,\ldots,(2-F_0)N_{bin}-1 \quad (20)$$

$$E(k)=(Y(k)W_i(k)+Y(k+N_s)W_i(k+N_s))-B_{win,i}(k)X(k) \quad (21)$$

$$k=(2-F_0)N_{bin},\ldots,N_{bin}-1. \quad (22)$$

As reflected in the equations above, useful information just outside the Nyquist band can be retrieved using the adaptation technique described. As such, the aliasing problem described earlier in connection with conventional approaches can be addressed while at the same time, the flexibility of controlling the size of the overlap by the over-sampling rate is maintained.

After the error signal is derived, adaptation by the W filter is performed in the frequency domain:

$$W_{i+1}(k)=W_i(k)-\mu E(k)Y^*(k))\,k=0,1,\ldots,N_{bin}-1 \quad (23)$$

$$W_{i+1}(k)=W_i(k)-\mu E(k-N_s)Y^*(k),k=N_{bin}F_0,\ldots,N_{bin}(2F_0-1)-1. \quad (24)$$

To achieve better performance, different step sizes (gearshift) are selected for the adaptation based on the iteration counter. The W filter is converted back to the time domain by performing an inverse FFT operation:

$$w_i(n)=\text{IFFT}(W_i(k))\,n=0,1,\ldots,N-1 \quad (25)$$

The W filter is windowed in the time domain, and taps outside the window are zeroed out. This results in $w_{win,i}(n)$ with only middle $N_{teq}$ taps that are non-zero values. The counter is updated:

$$i=i+1, \quad (26)$$

where the counter value (i) is monitored. If i<$N_{iter}$, then the B filter is updated again in the frequency domain and the sequence repeats. The window $w_{win}$ is normalized such that the maximum tap satisfies the fixed-point requirement while maintaining precision. The TEQ W filter is set to non-zeros taps of $w_{win,i}$. Finally, the time domain W filter coefficients are stored in memory (such as the mass storage component 326 depicted in FIG. 3).

With the derivation described above, TEQ training is performed according to a non-integer over-sampling factor $F_0$. For some embodiments, the following implementation is used where L=3 and M=2, where:

$$F_0 = \frac{L}{M} = 3/2 \tag{27}$$

If the original T-spaced TEQ filter W operates at sampling rate $f_s$, the T/2 fractionally-spaced TEQ will have a sampling rate $2f_s$. When the iterative LMS algorithm as outlined above is performed, the FFT size will be doubled compared to that of the T-spaced TEQ. On the other hand, if a 2T/3 fractionally-spaced TEQ is used, the sampling rate can be lowered and the FFT size will also be lower. At the same time, because the useful signal bandwidth normally will be smaller than $$\frac{f_s}{2} \times \frac{3}{2} \left(\text{but larger than } \frac{f_s}{2}\right),$$

the same advantages associated with a T/2-fractionally-spaced TEQ over the Nyquist rate TEQ can be achieved to overcome the aliasing problem and at the same time avoiding the filter coefficient divergence problem of a T/2-fractionally-spaced TEQ.

For embodiments where $F_0=3/2$, the following holds true:

$$B_i(k) = Y(k) \cdot \frac{W_i(k)}{X(k)} = Y(k)W_i(k)X^*(k) \tag{28}$$

$$k = 0, 1, \ldots, N_{bin}/2 - 1$$

$$B_i(k) = ((Y(k)W_i(k) + Y(k+N_{bin})W_i(k+N_{bin}))X^*(k) \tag{29}$$

$$k = \frac{N_{bin}}{2}, \ldots,$$

$$N_{bin} - 1. \tag{30}$$

The error signal in the frequency domain will be:

$$E(k) = Y(k)W_i(k) - B_{win,i}(k)X(k) k = 0, 1, \ldots, \frac{N_{bin}}{2} - 1 \tag{31}$$

$$E(k) = (Y(k)W_i(k) + Y(k+N_{bin})W_i(k+N_{bin})) - B_{win,i}(k) \tag{32}$$

$$k = \frac{N_{bin}}{2}, \ldots, N_{bin} - 1. \tag{33}$$

The W filter adaptation will be:

$$W_{i+1}(k) = W_i(k) - \mu E(k)Y^*(k)) k=0,1,\ldots,N_{bin}-1 \tag{34}$$

$$W_{i+1}(k) = W_i(k) - \mu E(k-N_s)Y^*(k), k=3N_{bin}/2,\ldots,2N_{bin}-1. \tag{35}$$

It can be seen that for embodiments where $F_0=3/2$, the expressions become simpler when compared to the general case described earlier. Furthermore, the implementation is also greatly simplified and resources from a MIPS standpoint are reduced when compared with to the T/2 fractionally-spaced TEQ.

Figure 4A:
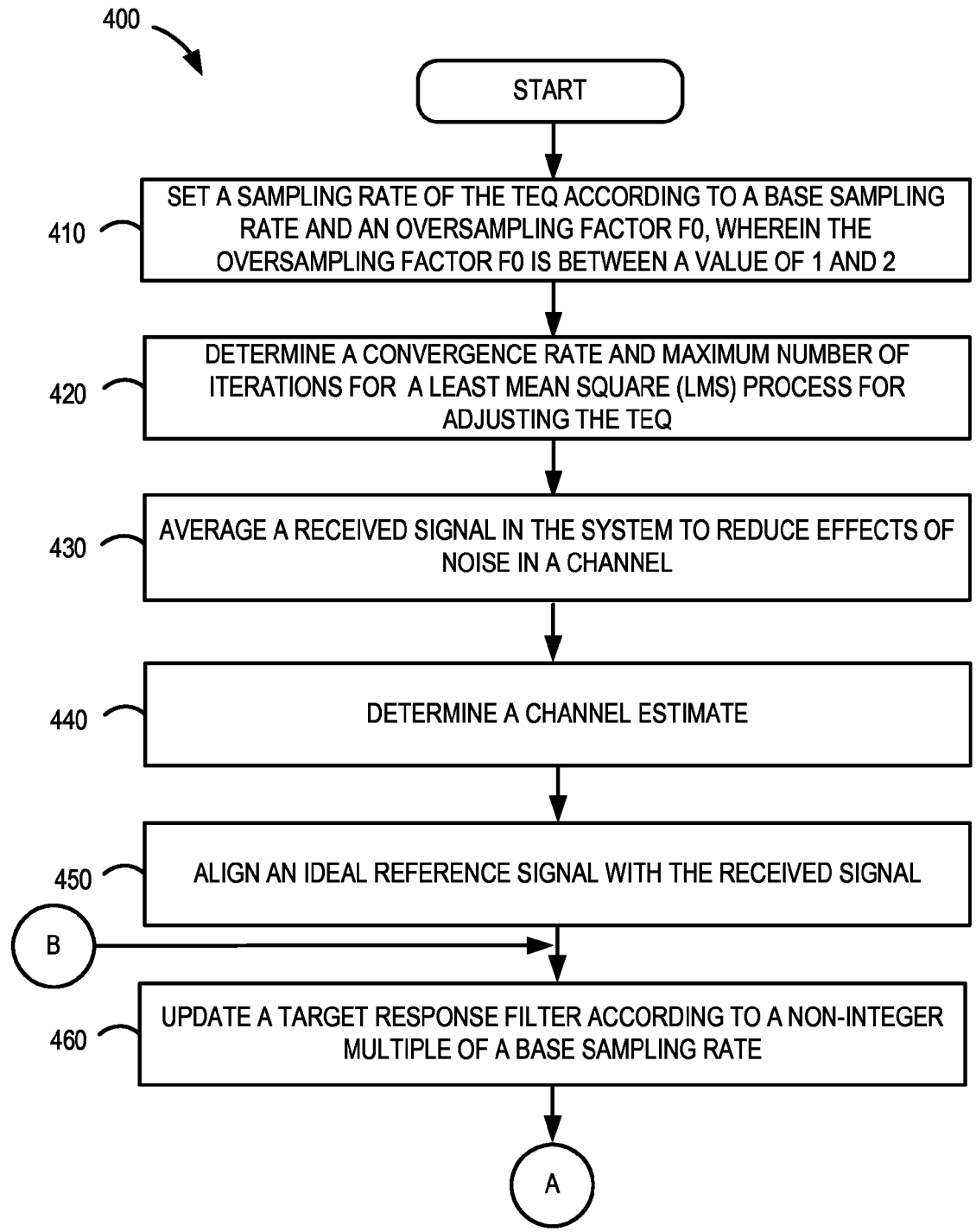
FIGS. 4A-B depict a flowchart for an embodiment of a TEQ training technique for a non-integer fractionally spaced time domain equalizer.
Figure 4B:
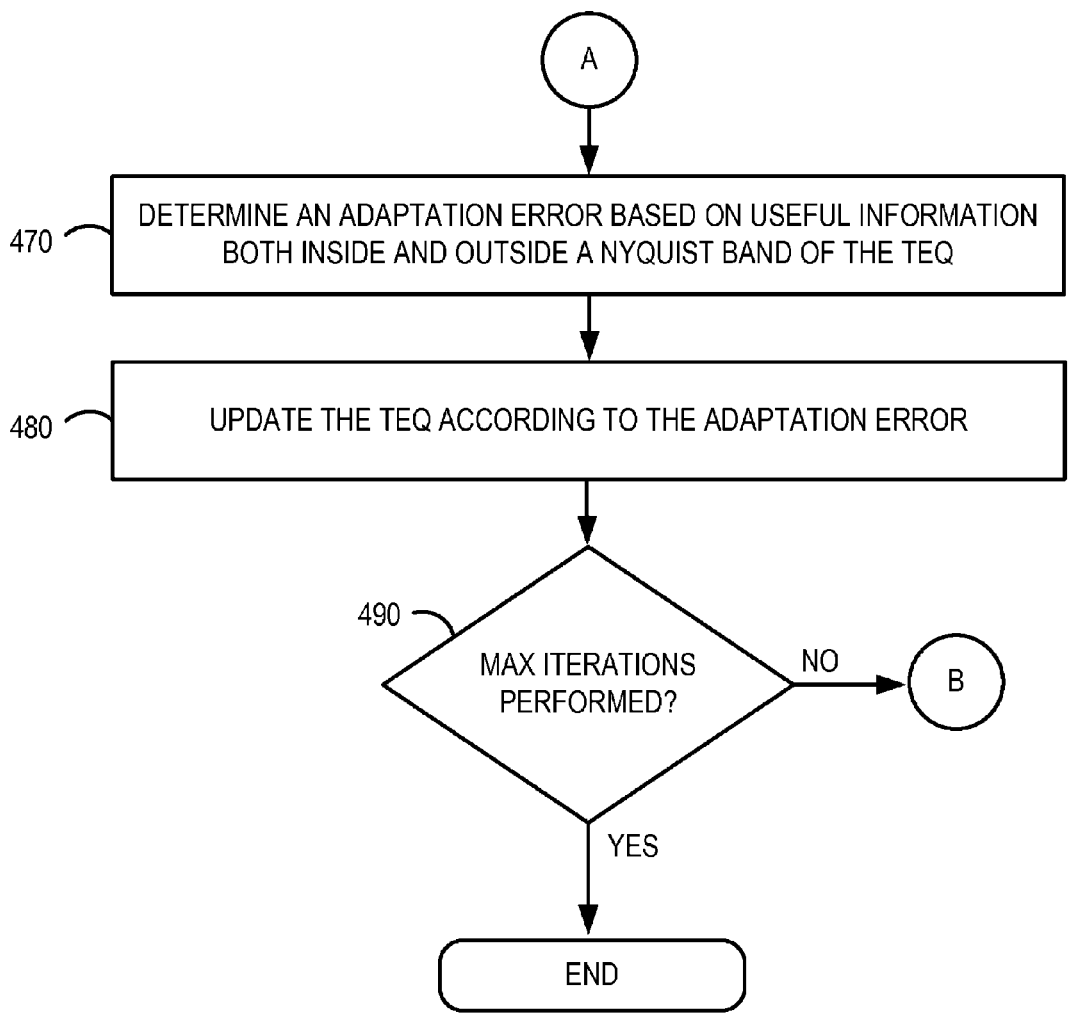

Reference is made to FIGS. 4A-B, which depict a flowchart 400 for an embodiment of a TEQ training technique for a non-integer fractionally spaced time domain equalizer. If embodied in software, each block depicted in FIGS. 4A-B represents a module, segment, or portion of code that comprises program instructions stored on a non-transitory computer readable medium to implement the specified logical function(s). In this regard, the program instructions may be embodied in the form of source code that comprises statements written in a programming language or machine code that comprises numerical instructions recognizable by a suitable execution system such as a processor implemented in a CPE 110 or CO 130 in FIG. 1. The machine code may be converted from the source code, etc. If embodied in hardware, each block may represent a circuit or a number of interconnected circuits to implement the specified logical function(s).

Although the flowchart 400 of FIGS. 4A-B shows a specific order of execution, it is understood that the order of execution may differ from that which is depicted. In accordance with one embodiment, a method implemented in a communication system for training a fractionally spaced time domain equalizer (TEQ) comprises setting a sampling rate of the TEQ according to a base sampling rate and an oversampling factor F0, wherein the oversampling factor F0 is between a value of 1 and 2 (block 410). The method further comprises determining a convergence rate and maximum number of iterations for a least mean square (LMS) process for adjusting the TEQ (block 420) and averaging a received signal in the system to reduce effects of noise in a channel (block 430). The method further comprises determining a channel estimate (block 440), aligning an ideal reference signal with the received signal (block 450), and updating a target response filter according to a non-integer multiple of a base sampling rate (block 460). The method also comprises determining an adaptation error based on useful information both inside and outside a Nyquist band of the TEQ (block 470) and updating the TEQ according to the adaptation error (block 480). In decision block 490, if a maximum number of iterations is reached, then processing stops. If the maximum number of iterations is not reached, then processing loops back to block 460, where the target filter is updated according to the non-integer sampling rate.

Figure 5A:
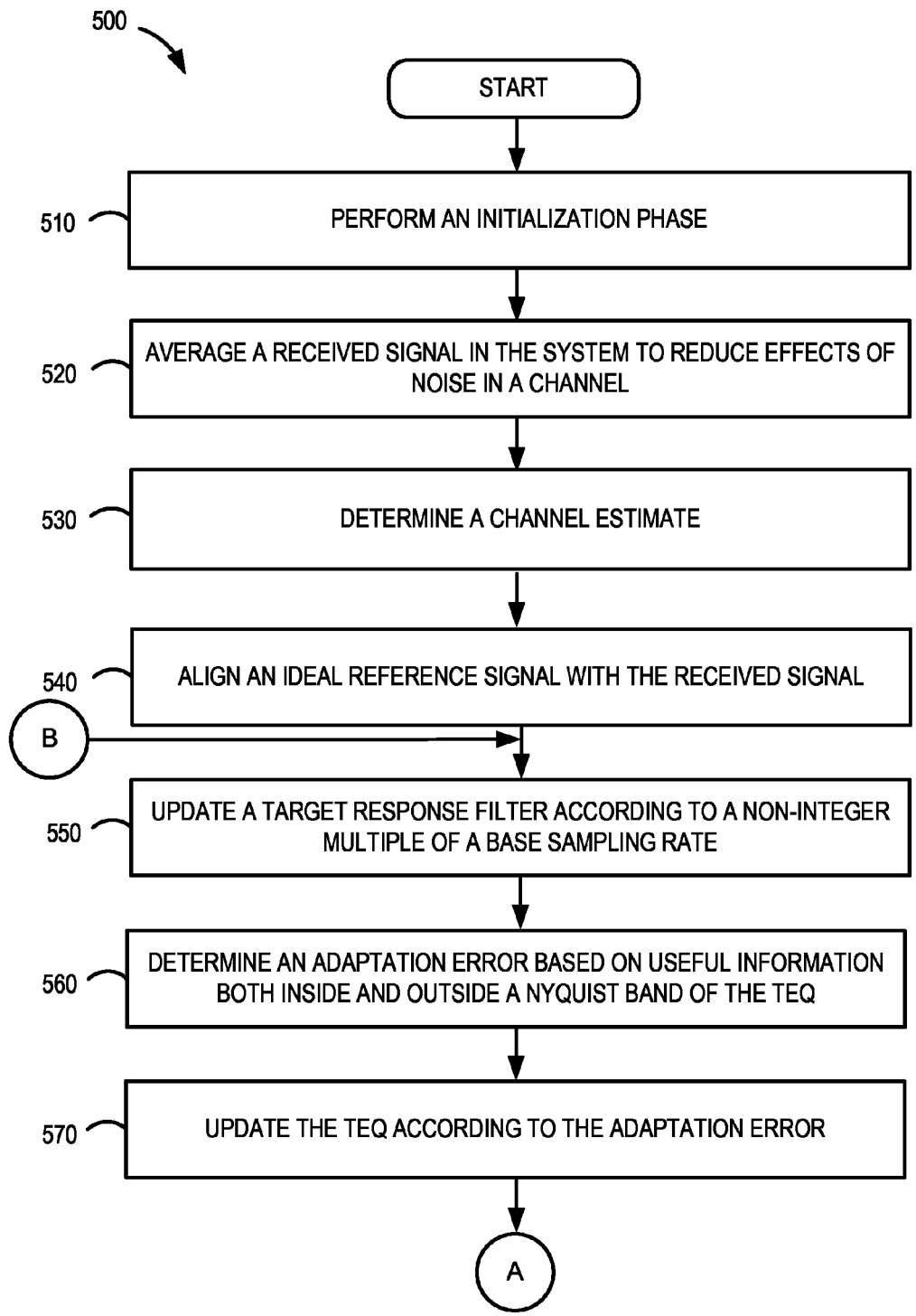
FIGS. 5A-B depict a flowchart for an alternative embodiment of a TEQ training technique for a non-integer fractionally spaced time domain equalizer.
Figure 5B:
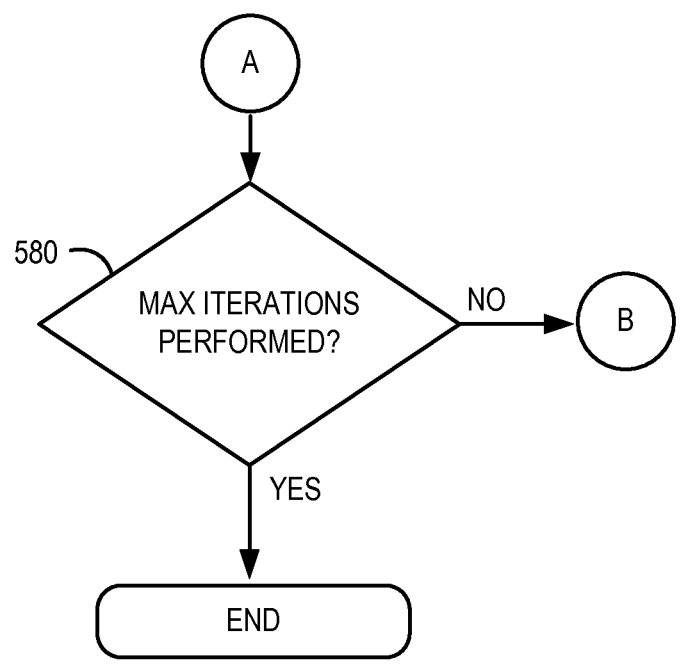

Reference is made to FIGS. 5A-B, which depict a flowchart 500 for an alternative embodiment of a TEQ training technique for a non-integer fractionally spaced time domain equalizer. If embodied in software, each block depicted in FIGS. 5A-B represents a module, segment, or portion of code that comprises program instructions stored on a non-transitory computer readable medium to implement the specified logical function(s). In this regard, the program instructions may be embodied in the form of source code that comprises statements written in a programming language or machine code that comprises numerical instructions recognizable by a suitable execution system such as a processor implemented in a CPE 110 or CO 130 in FIG. 1. The machine code may be converted from the source code, etc. If embodied in hardware, each block may represent a circuit or a number of interconnected circuits to implement the specified logical function(s).

Although the flowchart 500 of FIGS. 5A-B shows a specific order of execution, it is understood that the order of execution may differ from that which is depicted. In accordance with one embodiment, a method implemented in a communication system for training a fractionally spaced time domain equalizer (TEQ) comprises performing an initialization phase (block 510), where the maximum number of iterations to be performed is set. The method further comprises averaging a received signal in the system to reduce effects of noise in a channel (block 520), and determining a channel estimate (block 530). The method further comprises aligning an ideal reference signal with the received signal (block 540), updating a target response filter according to a non-integer multiple of a base sampling rate (block 550), determining an adaptation error based on useful information both inside and outside a Nyquist band of the TEQ (block 560), and updating the TEQ according to the adaptation error (block 570). In decision block 580, if the maximum number of iterations defined in block 510 is met, then processing stops. If the maximum number of iterations has not been reached, then processing continues by looping back to block 550, where the target response filter is updated according to a non-integer sampling rate.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

At least the following is claimed:

1. A method for training a time domain equalizer (TEQ) in the frequency domain, comprising:
    setting a sampling rate of the TEQ according to a base sampling rate multiplied by an oversampling factor F0, wherein the oversampling factor F0 is a non-integer value greater than 1 and less than 2; and
    determining a difference between a desired frequency domain signal and an actual frequency domain signal,
    wherein the actual frequency domain signal is determined according to a received frequency domain signal convolved with a frequency response of the TEQ, where both the received frequency domain signal and the frequency response of the TEQ are constructed from time domain signals sampled at a rate equal to F0 times the base sampling rate.

2. The method of claim 1, wherein F0 is defined according to a first integer L and a second integer M such that F0 is defined according to L/M.

3. The method of claim 2, wherein L=3 and M=2.

4. The method of claim 1, wherein the desired frequency domain signal is determined according a transmit frequency domain signal convolved with a target frequency response.

5. The method of claim 4, wherein the target frequency response is determined according to a time domain signal constrained to a specific number of non-zero samples at the base sampling rate.

6. A method implemented in a communication system for training a fractionally spaced time domain equalizer (TEQ), comprising:
    performing an initialization phase;
    averaging a received signal in the system to reduce effects of noise in a channel;
    determining a channel estimate;
    aligning an ideal reference signal with the received signal;
    updating a target response filter according to a non-integer multiple of a base sampling rate;
    determining an adaptation error based on useful information both inside and outside a Nyquist band of the TEQ; and
    updating the TEQ according to the adaptation error.

7. The method of claim 6, wherein the target response filter and the TEQ are limited to corresponding windows, each window having a fixed numbers of non-zero samples.

8. The method of claim 7, wherein the corresponding windows have different fixed numbers of non-zero samples.

9. The method of claim 6, wherein the received signal comprises a substantially periodic signal.

10. The method of claim 9, wherein the communication system comprises a digital subscriber line (xDSL) system, and wherein the periodic signal comprises REVERB symbols.

11. The method of claim 6, wherein the target response filter is limited to a predetermined number of non-zero samples at the base sampling rate.

12. The method of claim 6, further comprising setting a sampling rate of the TEQ according to a base sampling rate and an oversampling factor F0, wherein the oversampling factor F0 is greater than 1.

13. The method of claim 12, wherein the oversampling factor F0 is 3/2.

14. The method of claim 6, wherein the steps of updating a target response filter, determining an adaptation error, and updating the TEQ are performed according to a least mean squares (LMS) algorithm.

15. The method of claim 14, wherein performing an initialization phase comprises:
    setting an initial step size associated with the LMS algorithm; and setting a maximum iterations.

16. The method of claim 6, wherein the steps of updating a target response filter, determining an adaptation error, and updating the TEQ are performed a number of iterations less than or equal to the maximum iterations.

17. The method of claim 6, wherein the non-integer multiple of a base sampling rate is 3/2.

18. A system for training a fractionally spaced time domain equalizer (TEQ), comprising:
    logic for setting a sampling rate of the TEQ according to a base sampling rate and an oversampling factor F0, wherein the oversampling factor F0 is between a value of 1 and 2;
    logic for determining a convergence rate and maximum number of iterations for a least mean square (LMS) process for adjusting the TEQ; logic for averaging a received signal in the system to reduce effects of noise in a channel;
    logic for determining a channel estimate;
    logic for aligning an ideal reference signal with the received signal;
    logic for updating a target response filter according to a non-integer multiple of the base sampling rate;
    logic for determining an adaptation error based on useful information both inside and outside a Nyquist band of the TEQ; and
    logic for updating the TEQ according to the adaptation error.

19. The system of claim 18, wherein the oversampling factor F0 is 3/2.

20. The system of claim 18, wherein logic for aligning an ideal reference signal with the received signal comprises logic for performing a circular shift in the time domain on the averaged received signal based on a delay.

21. The system of claim 20, wherein the delay is determined based on a peak location in the channel estimate in the time domain.

22. The system of claim 20, wherein the delay is determined based on energy in a window of the channel estimate.

* * * * *

UNITED STATES PATENT AND TRADEMARK OFFICE
CERTIFICATE OF CORRECTION

PATENT NO. : 8,767,812 B2  
APPLICATION NO. : 13/081962  
DATED : July 1, 2014  
INVENTOR(S) : Li et al.

Page 1 of 1

It is certified that error appears in the above-identified patent and that said Letters Patent is hereby corrected as shown below:

In the Specification

In Column 11, Line 55, in Equation (32), delete "$E(k) = (Y(k)W_i(k) + Y(k + N_{bin})W_i(k + N_{bin})) - B_{win,i}(k)$," and insert -- $E(k) = (Y(k)W_i(k) + Y(k + N_{bin})W_i(k + N_{bin})) - B_{win,i}(k)X(k)$ --, therefor.

Signed and Sealed this  
Second Day of September, 2014

Michelle K. Lee  
*Deputy Director of the United States Patent and Trademark Office*